United States Patent
Yanagawa et al.

(10) Patent No.: US 7,746,741 B2
(45) Date of Patent: Jun. 29, 2010

(54) INFORMATION RECORDING DEVICE AND METHOD, AND COMPUTER PROGRAM

(75) Inventors: Naoharu Yanagawa, Saitama (JP); Masahiro Kato, Saitama (JP)

(73) Assignee: Pioneer Corporation, Tokyo (JP)

( * ) Notice: Subject to any disclaimer, the term of this patent is extended or adjusted under 35 U.S.C. 154(b) by 808 days.

(21) Appl. No.: 11/596,074

(22) PCT Filed: May 9, 2005

(86) PCT No.: PCT/JP2005/008439

§ 371 (c)(1),
(2), (4) Date: Jan. 4, 2007

(87) PCT Pub. No.: WO2005/109409

PCT Pub. Date: Nov. 17, 2005

(65) Prior Publication Data

US 2008/0259755 A1 Oct. 23, 2008

(30) Foreign Application Priority Data

May 11, 2004 (JP) .............................. 2004-141420

(51) Int. Cl.
*G11B 7/00* (2006.01)
(52) U.S. Cl. .................................. 369/47.53
(58) Field of Classification Search ....................... None
See application file for complete search history.

(56) References Cited

U.S. PATENT DOCUMENTS

| 2003/0043714 | A1* | 3/2003 | Takeda | 369/47.53 |
| 2004/0136303 | A1* | 7/2004 | Watanabe et al. | 369/53.36 |
| 2004/0233808 | A1* | 11/2004 | Takeda | 369/47.53 |
| 2006/0098547 | A1* | 5/2006 | Horikawa et al. | 369/59.11 |

FOREIGN PATENT DOCUMENTS

| JP | 6-349066 | 12/1994 |
| JP | 2002-352517 | 12/2002 |
| JP | 2002-373422 | 12/2002 |
| JP | 2003-59048 | 2/2003 |

OTHER PUBLICATIONS

Horikawa et al., WO 03/107332, published Dec. 24, 2003.*

* cited by examiner

*Primary Examiner*—Peter Vincent Agustin
(74) *Attorney, Agent, or Firm*—Young & Thompson

(57) ABSTRACT

An information recording device (1) is provided with a recording element (501) for recording information in an information recording medium (100) wherein pre-information (LPP) is previously recorded for controlling recording of recording information, by irradiating laser beams (LB) of a prescribed power, and a control element (504) for controlling the recording element to record the recording information with a power which permits a first reproduction quality (AR characteristic), which is a pre-information reproduction quality, to satisfy a prescribed first standard.

12 Claims, 10 Drawing Sheets

[FIG. 1]
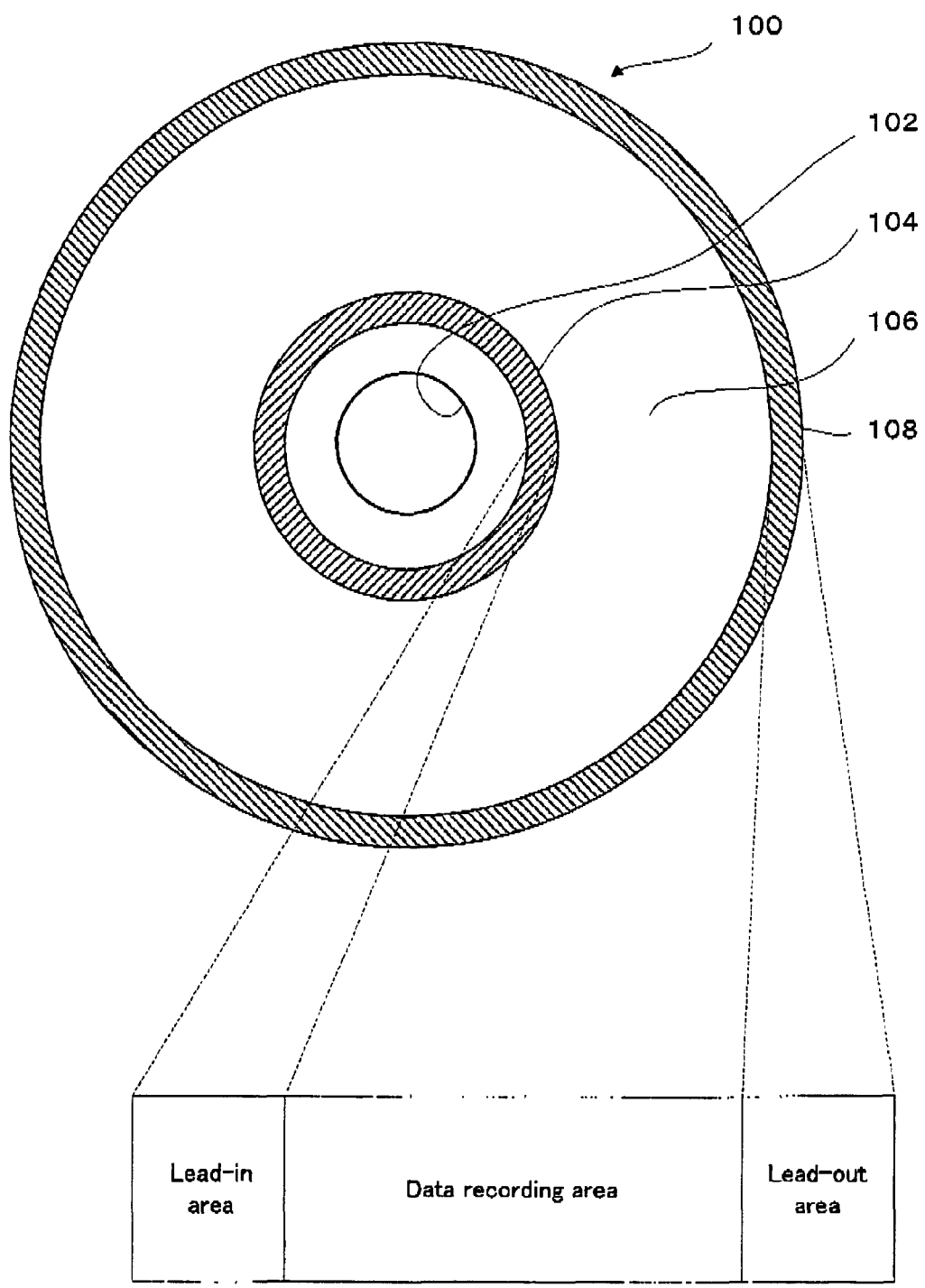

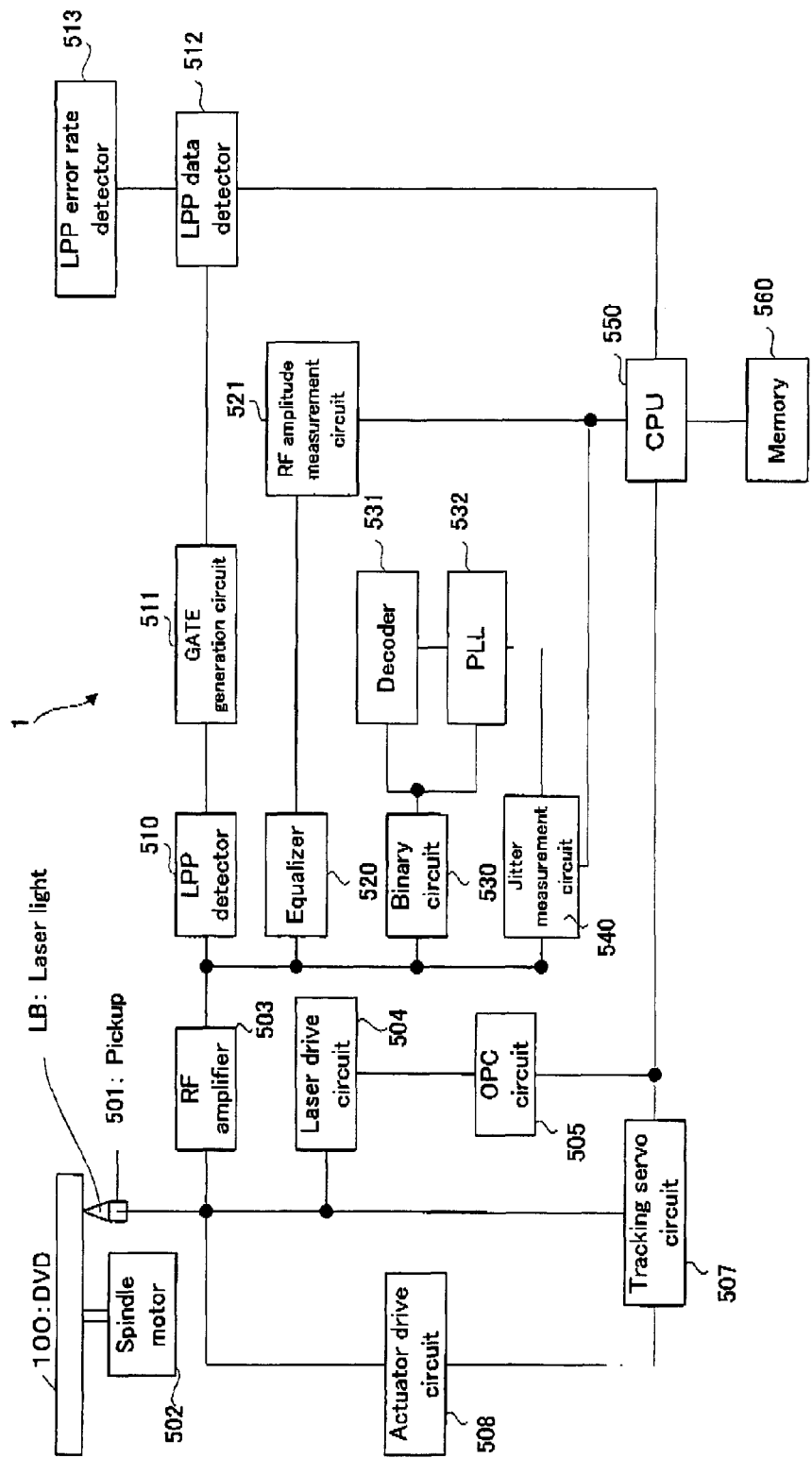
[FIG. 2]

[FIG. 3]
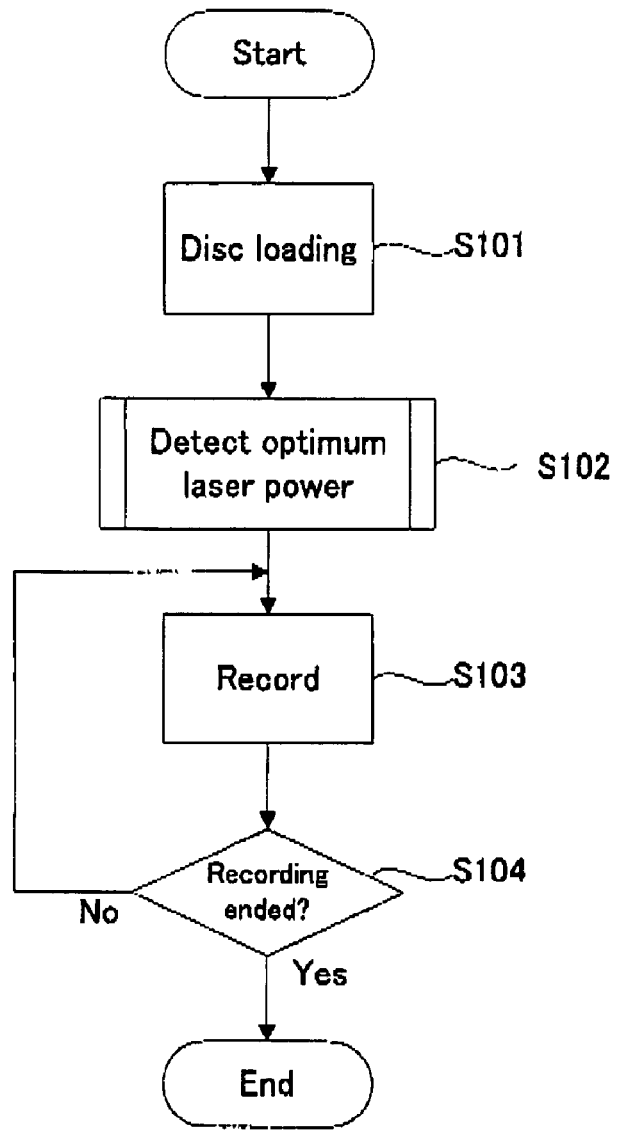

[FIG. 4]
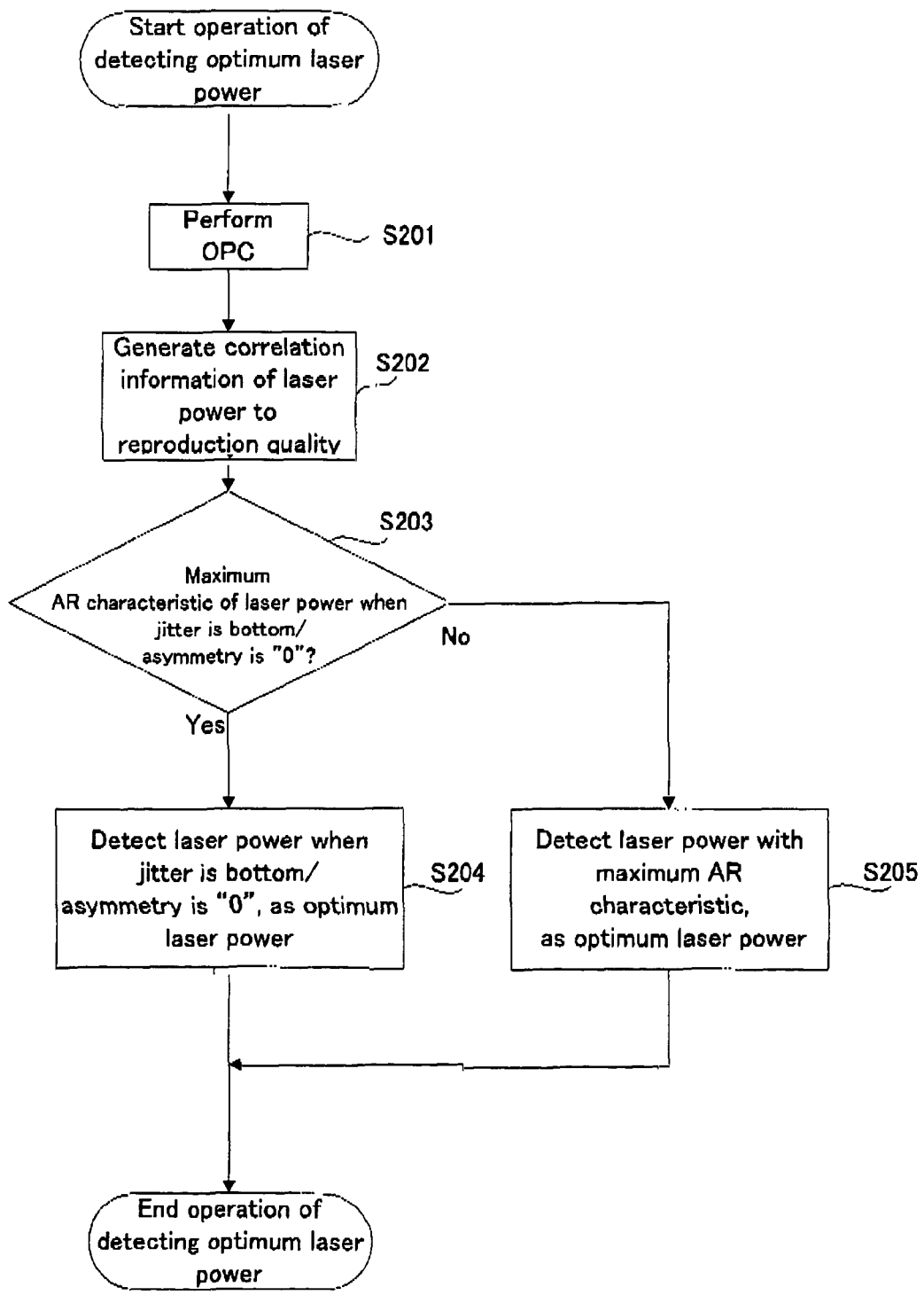

[FIG. 5]
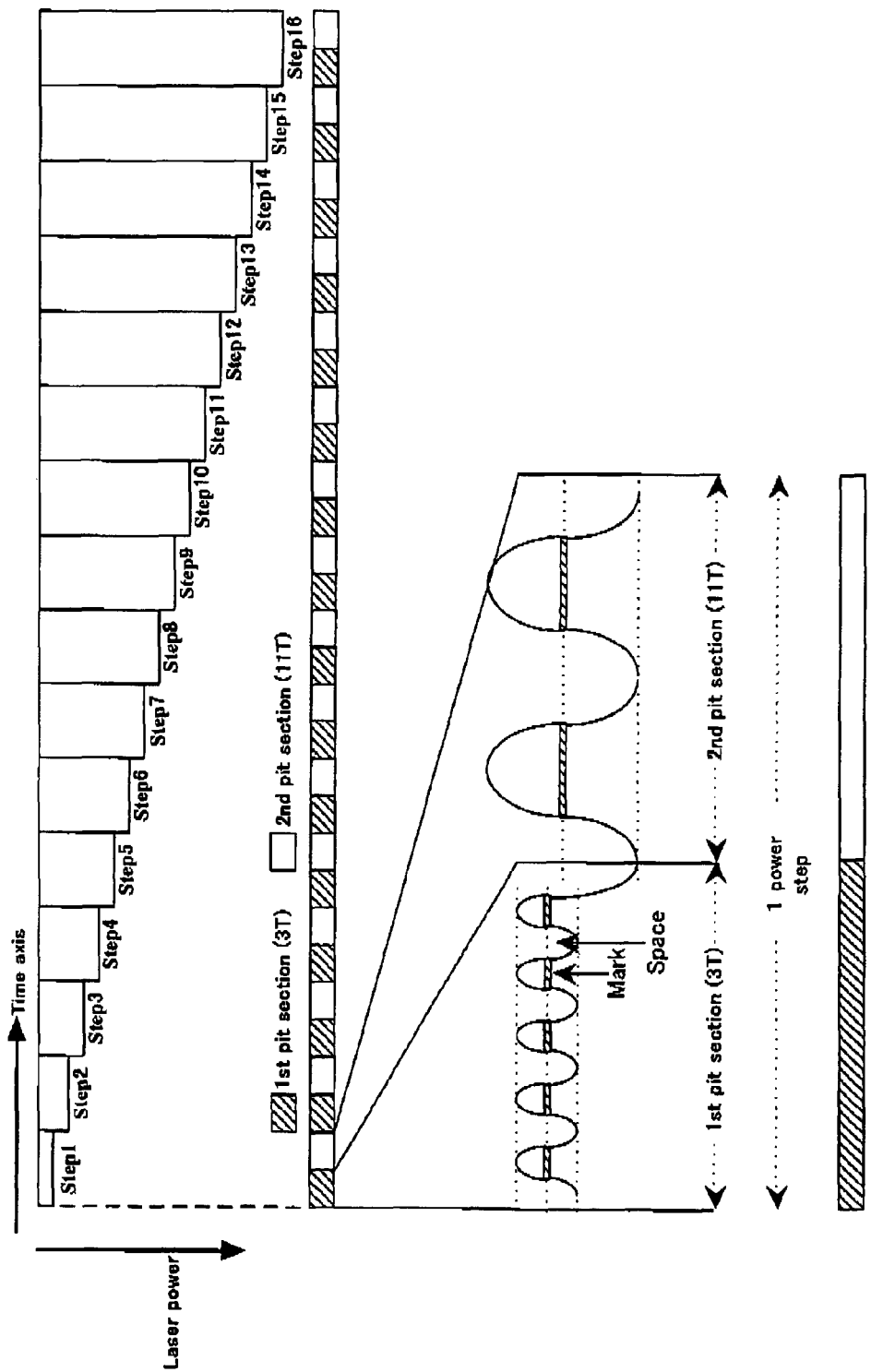

[FIG. 6]
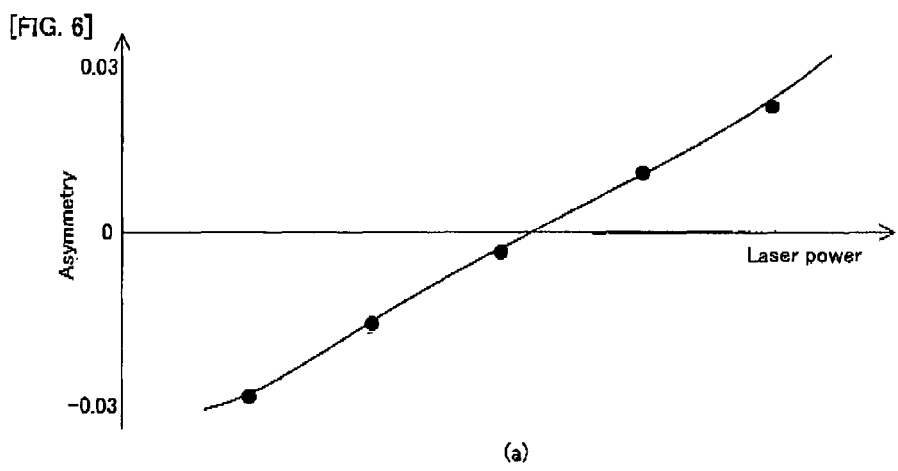
(a)
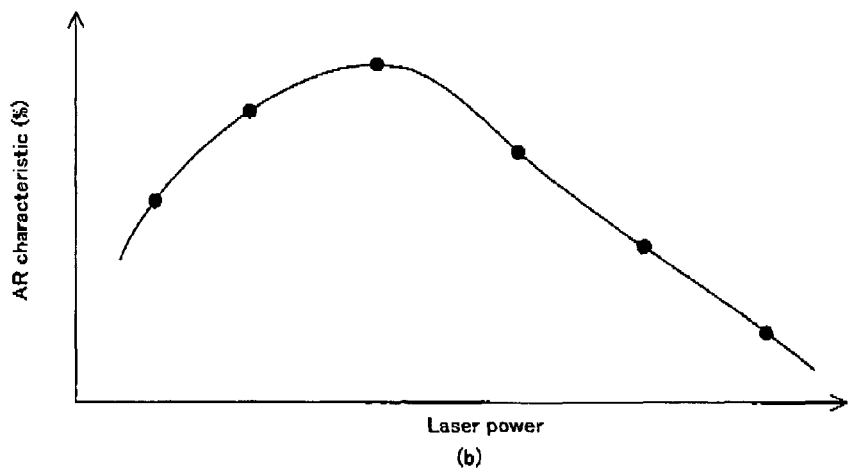
(b)
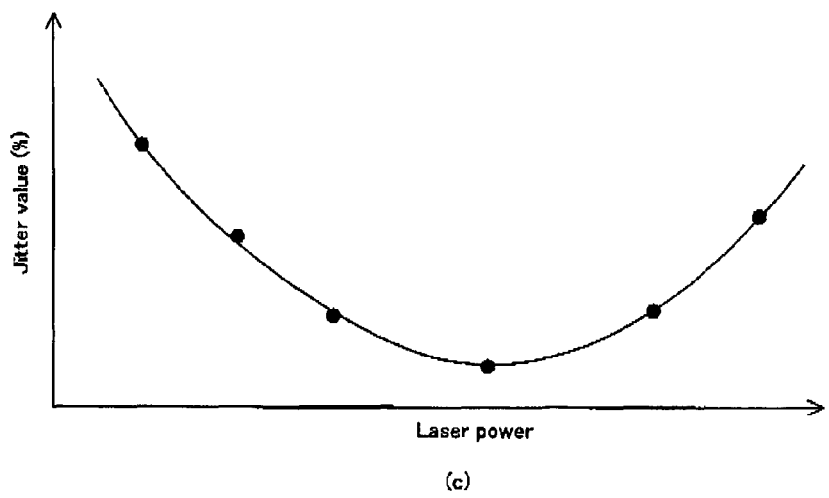
(c)

[FIG. 7]
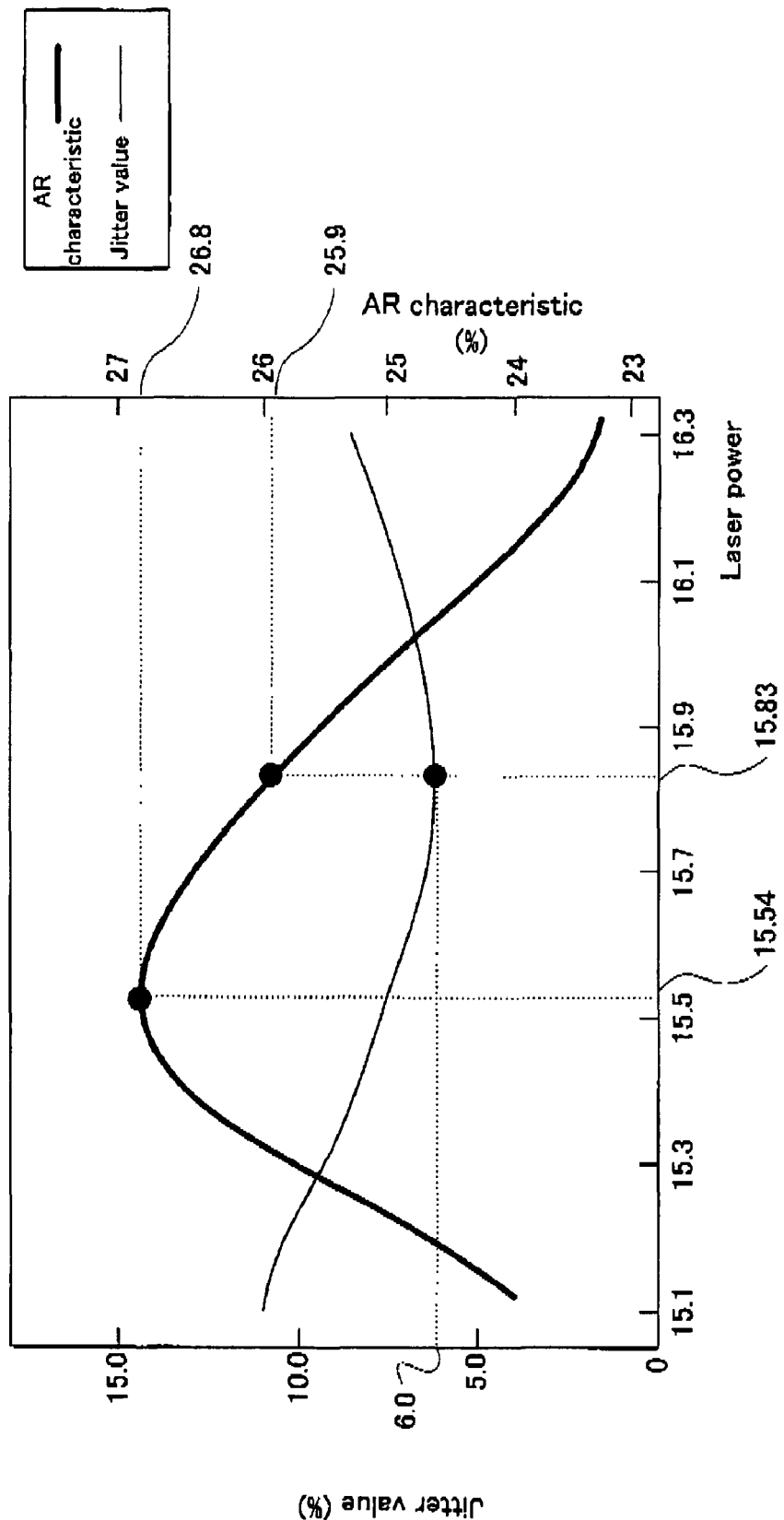

[FIG. 8]
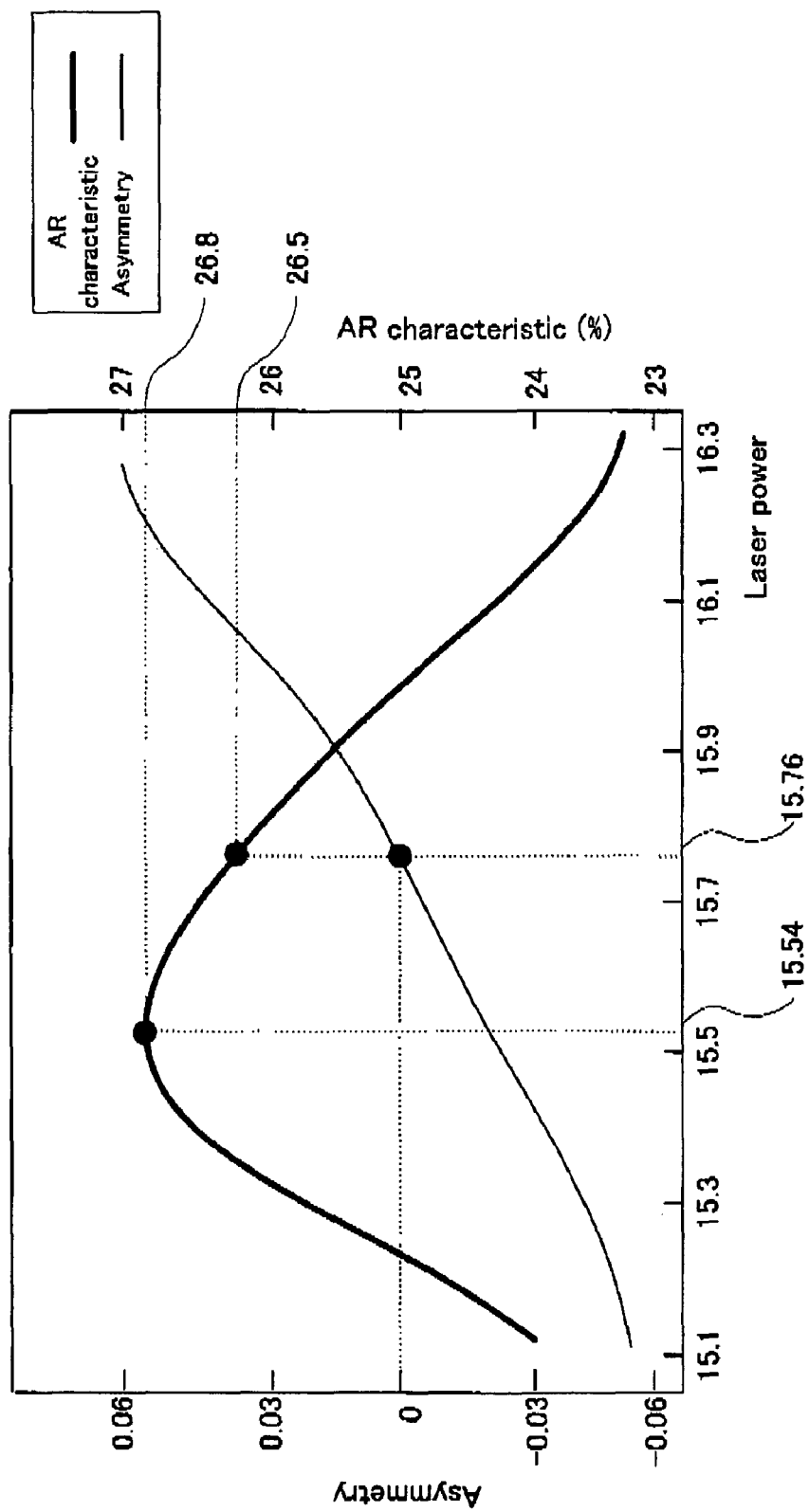

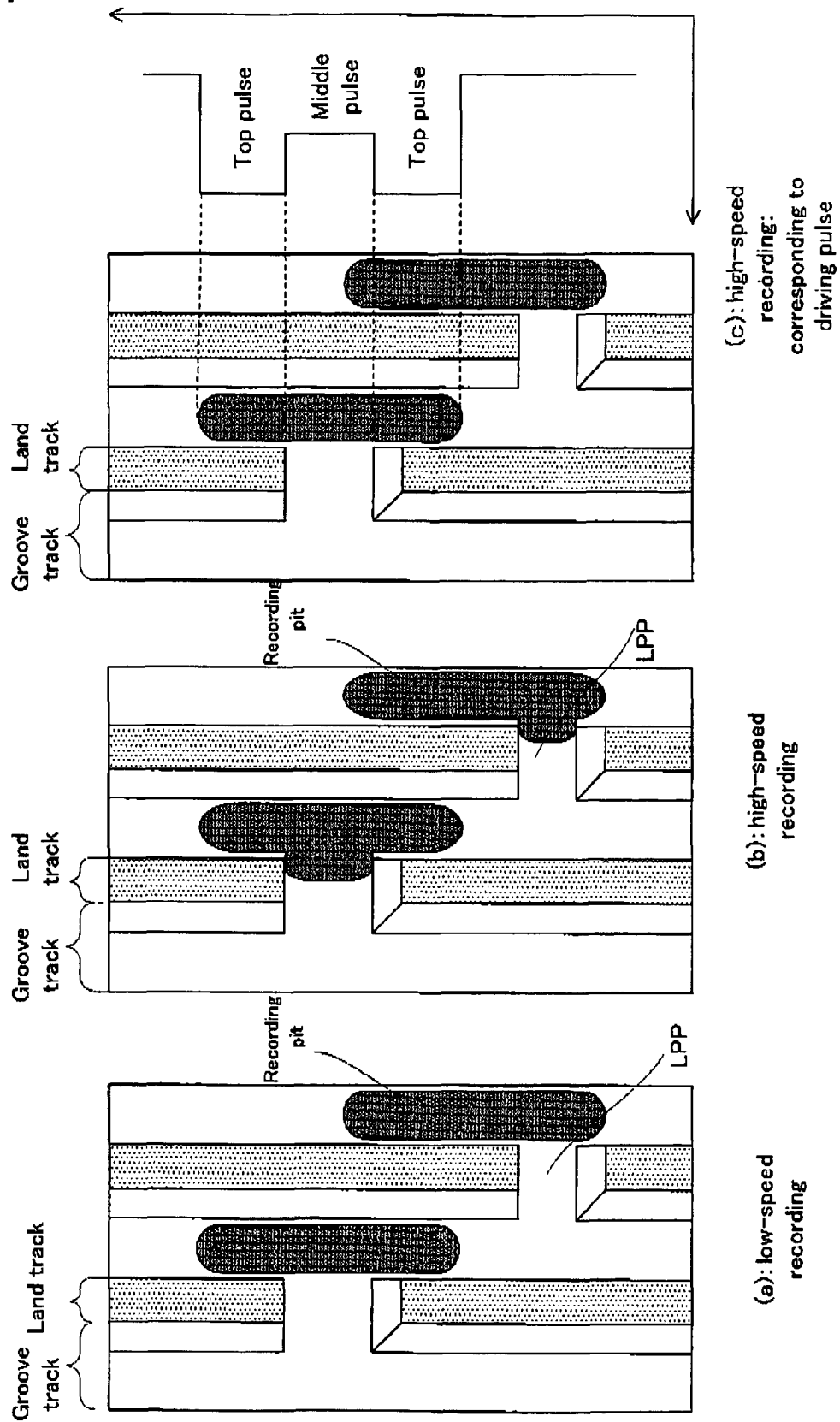
[FIG. 9]

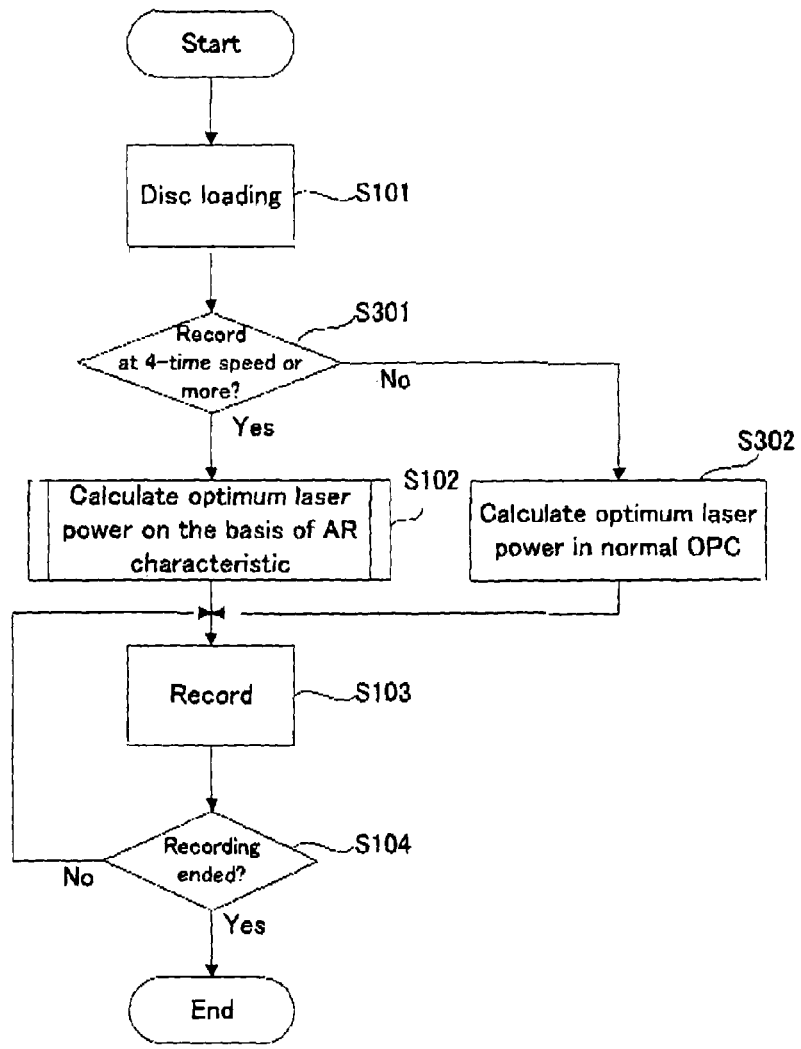

INFORMATION RECORDING DEVICE AND METHOD, AND COMPUTER PROGRAM

TECHNICAL FIELD

The present invention relates to an information recording apparatus, such as a DVD recorder, for example, an information recording method, and a computer program which makes a computer function as the information recording apparatus.

BACKGROUND ART

On an information recording apparatus for recording information onto an information recording medium, such as an optical disc, for example, an optimum power is set by an Optimum Power Control (OPC) process according to the type of the optical disc, the type of the information recording/reproducing apparatus, the recording speed and the like. Namely, the calibration of the power is performed. By this, a proper recording operation can be realized. For example, if the optical disc is inserted or loaded and a writing command is inputted, light intensity is changed sequentially step-by-step, and test writing data is recorded into a power calibration area, and a so-called test writing process is performed. After that, the test writing data recorded in this manner is reproduced. The reproduction result is judged by using a predetermined evaluation standard, to thereby set the optimum power. As the evaluation standard, for example, there are an evaluation method based on asymmetry, as disclosed in a patent document 1, and an evaluation method based on a jitter value, as disclosed in a patent document 2, or the like.

On the other hand, a recording speed for recording data onto these information recording media increases with technological advances, and a 2-time recording speed and a 4-time recording speed or the like are realized, for example.

Patent document 1: Japanese Patent Application Laid Open NO. 2003-59048

Patent document 2: Japanese Patent Application Laid Open NO. 2002-352517

DISCLOSURE OF INVENTION

Subject to be Solved by the Invention

However, as the data recording speed increases in this manner, the rotational speed of the optical disc also increases, so that the conditions that laser light is irradiated are different from the conditions in the case of a relatively slow recording speed. Thus, in the case of a relatively fast recording speed, even if the above-mentioned conventional OPC is performed to calibrate the power, there is such a technical problem that the data cannot be properly recorded onto the optical disc. Namely, if the data is recorded onto the optical disc by using high recording speed, the reproduction quality of land pre-pits deteriorates after the data is recorded. Thus, there is such a technical problem that the land pre-pits cannot be properly reproduced.

In order to solve the above-mentioned conventional problem, it is therefore an object of the present invention to provide an information recording apparatus and an information recording method, which enable data recording without deteriorating the reproduction quality of the data recorded onto an information recording medium, such as an optical disc, for example, and a computer program which makes a computer function as the information recording apparatus.

Means for Solving the Subject (Information Recording Apparatus)

The above object of the present invention can be achieved by an information recording apparatus provided with: a recording device for recording record information, by irradiating laser light having a predetermined power, onto an information recording medium on which pre-information for controlling the recording of the record information is recorded in advance; and a controlling device for controlling the recording device to record the record information with such the power that first reproduction quality, which is reproduction quality of the pre-information, satisfies a predetermined first reference.

According to this aspect, by the operation of the recording device, it is possible to record the record information by irradiating the information recording medium with the laser light.

Particularly in the present invention, there is provided the controlling device for controlling the recording device to record the record information with the power (e.g. an optimum laser power in an embodiment described later) which realizes the condition that the first reproduction quality (e.g. an AR (Aperture Ratio) characteristic described later or the like), which is the reproduction quality of the pre-information (e.g. LPP described later) for controlling the recording of the record information, satisfies the predetermined first reference. The "predetermined first reference" herein indicates such a reference that the first reproduction quality of the pre-information obtained in reproducing the record information recorded with a certain laser power, can realize a preferable condition or numerical value. Namely, with regard to the record information on which the first reproduction quality satisfies the predetermined first reference, the preferable reproduction is ensured. This predetermined first reference may be set in advance, or may be set as occasion demands, depending on the recording operation.

By this, on the information recording apparatus which irradiates the laser light having a variable power, it is possible to preferably record the record information with the optimum power. Therefore, according to the information recording apparatus of the present invention, it is possible to record the record information which can realize the preferable reproduction quality.

Incidentally, on a conventional information recording apparatus, the reproduction quality of the record information to be recorded depends on the optimum power detected by OPC (Optimum Power Control) or the like. In particular, in the OPC or the like, the optimum power is detected such that the asymmetry or the jitter value or the like as the reproduction quality of the record information is in a preferable condition. However, particularly at the time of high-speed recording, even if the information is recorded by using the laser light having the power by which the asymmetry ratio or the jitter value of reproduction information is good, there is also a possibility that another reproduction quality (e.g. the first reproduction quality of the pre-information) deteriorates. However, on the information recording apparatus of the present invention, the recording device is controlled (i.e. the power is controlled) to realize the preferable reproduction quality of the record information such that the reproduction quality of the record information is in the preferable condition (particularly, such that the first reproduction quality of the pre-information satisfies the first reference). Thus, it is possible to further improve the reproduction quality, as compared to the reproduction quality of the record information which is recorded by the conventional information recording apparatus.

Consequently, according to the information recording apparatus of the present invention, it is possible to record the record information by using the laser light with the proper power. Along with that, it is possible to further improve the reproduction quality of the record information to be recorded.

In one aspect of the information recording apparatus of the present invention, the record information is recorded on the information recording medium, by using a 4-time recording speed or more, as compared to a standard recording speed in recording the record information.

According to this aspect, it is possible to effectively prevent the deterioration of the reading characteristic of the pre-information after the record information is recorded, which matters particularly at the time of high-speed recording (i.e. at the time of recording at the about 4-time recording speed or more, as compared to a 1-time recording speed, which is the standard recording speed). Therefore, it is possible to improve the reproduction quality of the record information (particularly, the first reproduction quality of the pre-information), at the time of both low-speed recording and high-speed recording.

In other words, the information recording apparatus of the present invention cannot be obtained by merely changing the asymmetry or the jitter value, which are the evaluation reference for the detection of the optimum laser power in the conventional OPC, to the first reproduction quality of the pre-information. Namely, according to the present invention, it focuses on improving the reproduction quality of the pre-information, which particularly matters at the time of high-speed recording, while setting the asymmetry and the jitter value in an allowable range, to thereby achieve a new effect. It has such a characteristic effect that it is possible to effectively avoid the deterioration of the reproduction quality of the pre-information at the time of high-speed recording (i.e. it is possible to effectively improve the reproduction quality), which cannot be solved in the conventional OPC.

In an aspect of the information recording apparatus in which the record information can be recorded by using the high recording speed, as described above, if the record information is recorded by using the 4-time recording speed or more, the controlling device may control the recording device to record the record information with such the power that the reproduction quality of the pre-information satisfies the first reference, and if the record information is recorded by using a recording speed less than a 4-time recording speed, as compared to the standard recording speed, the controlling device may control the recording device to record the record information with such the power that at least one of a jitter value and an asymmetry value as second reproduction quality, which is reproduction quality of the record information, satisfies a predetermined second reference.

By virtue of such construction, it is possible to separate the reference which is used in controlling the power, between the recording operation performed by using a relatively high recording speed of 4-time speed or more and the recording operation performed by using a relatively low recording speed less than 4-time speed. Therefore, it is possible to effectively prevent, at the time of high-speed recording, the deterioration of the reproduction quality of the pre-information after the record information is recorded, which matters particularly at the time of high-speed recording. On the other hand, at the time of low-speed recording in which the deterioration of the reproduction quality of the pre-information is not such a big problem, it is possible to maintain the jitter value or the asymmetry, which are another reproduction quality, in a better condition. Therefore, as a whole, even at the time of low-speed recording and high-speed recording, it is possible to preferably improve the reproduction quality of the record information to be recorded.

In another aspect of the information recording apparatus of the present invention, it is further provided with a selecting device for selecting whether the recording device is controlled to record the record information with such the power that the first reproduction quality of the pre-information satisfies the first reference, or the recording device is controlled to record the record information with such the power that at least one of a jitter value and an asymmetry value as second reproduction quality, which is reproduction quality of the record information, satisfies a predetermined second reference.

According to this aspect, by the operation of the selecting device, it is possible to change the method of controlling the recording device, as occasion demands. Thus, it is possible to control the recording device in a more preferable method, as needed. Therefore, it is possible to improve the quality of the record information to be recorded, more preferably.

In another aspect of the information recording apparatus of the present invention, the controlling device controls the recording device to record the record information with such the power that the first reproduction quality satisfies the first reference, on the basis of correlation information indicating a correlation between the power and the first reproduction quality.

According to this aspect, it is possible to properly control the recording device, on the basis of the correlation information. Therefore, it is possible to improve the reproduction quality of the record information which is recorded onto the information recording medium.

In an aspect of the information recording apparatus in which the recording device is controlled on the basis of the correlation information, as described above, it may be further provided with a generating device for generating the correlation information, by controlling the recording device to record test information for test recording onto the information recording medium while changing the power, and by measuring the first reproduction quality of the pre-information recorded in advance in a recording area in which the test information is recorded.

According to this aspect, as in the OPC described later, for example, by recording the test information while changing the power step-by-step or continuously, it is possible to preferably generate the correlation information. Thus, it is possible to preferably control the power, on the basis of the generated correlation information. In particular, the recording device is controlled on the basis of the correlation between the record information actually recorded and the reproduction quality, it is possible to preferably control the recording device, regardless of variations of each information recording apparatus and variations of each information recording medium, or the like.

In an aspect of the information recording apparatus provided with the generating device, as described above, the recording device may record the generated correlation information onto the information recording medium.

By virtue of such construction, it is possible to continuously use the once generated correlation information, even after the generation. Therefore, it is possible to save the effort of generating the correlation information again another time the power is controlled.

In particular, the correlation information is recorded on the information recording medium. Thus, even if the information recording medium is ejected from the information recording apparatus and then newly loaded on another information recording apparatus, it is possible to properly control the recording device, as described above, by using the correlation information recorded in the information recording medium.

In an aspect of the information recording apparatus provided with the generating device, as described above, it may be further provided with a storing device for storing the generated correlation information.

By virtue of such construction, it is possible to continuously use the once generated correlation information, even after the generation. Therefore, it is possible to save the effort of generating the correlation information again another time the recording device is controlled.

In particular, the correlation information is stored in the storing device, provided for the information recording apparatus itself. Thus, even when the record information is recorded onto another information recording medium, different from the information recording medium on which the correlation information is generated, it is possible to control the power by using the correlation information. In particular, it is effective when the record information is recorded onto the information recording medium of the same type, the information recording medium of the same quality, the information recording medium generated by the same manufacturer, or the like.

At this time, the correlation information is preferably stored while distinguishing it for each identification number of the information recording medium (e.g. manufacturer's number, disc ID, or the like).

In another aspect of the information recording apparatus of the present invention, the pre-information is recorded in advance on the information recording medium by using pre-pits formed on a recording track of the information recording medium.

According to this aspect, in a DVD-R and a DVD-RW or the like, which are one example of the information recording medium, the recording device can be properly controlled, so that it is possible to preferably improve the reproduction quality of the record information which is recorded onto the information recording medium (particularly, the reproduction quality of the pre-information).

In an aspect of the information recording apparatus in which the pre-information is recorded in advance by using the pre-pits, as described above, it may be further provided with a measuring device for measuring the first reproduction quality, on the basis of maximum amplitude and minimum amplitude of a push-pull signal generated by reproducing the pre-pits.

By virtue of such construction, it is possible to properly measure the first reproduction quality, which is the reproduction quality of the pre-information, on the basis of the push-pull signal. Therefore, it is possible to properly control the recording device, on the basis of this measured first reproduction quality.

In an aspect of the information recording apparatus in which the record information is recorded onto the information recording medium on which the pre-information is recorded by using the pre-pits, as described above, it may be further provided with a measuring device for measuring the first reproduction quality, on the basis of a reproduction error rate of the pre-information obtained by reproducing the pre-pits.

By virtue of such construction, it is possible to properly measure the first reproduction quality, which is the reproduction quality of the pre-information, on the basis of the error rate of the pre-information. Therefore, it is possible to properly control the recording device, on the basis of this measured first reproduction quality.

In another aspect of the information recording apparatus of the present invention, the pre-information is recorded in advance on the information recording medium by using a modulation signal which is added to a recording track of the information recording medium which oscillates in a predetermined cycle.

According to this aspect, in a DVD+R, a DVD+RW, and a DVD-RAM or the like, which are one example of the information recording medium, the recording device can be properly controlled, so that it is possible to preferably improve the reproduction quality of the record information which is recorded onto the information recording medium (particularly, the reproduction quality of the pre-information).

In another aspect of the information recording apparatus of the present invention, the controlling device controls the recording device to record the record information with the power that the first reproduction quality of the pre-information satisfies the first reference, in the case where at least one of a jitter value and an asymmetry value as second reproduction quality, which is reproduction quality of the record information, satisfies a predetermined second reference.

By virtue of such construction, it is possible to control the recording device, sufficiently considering the improvement in not only the reproduction quality of the pre-information after the recording of the record information, but also the jitter value and the asymmetry, which are another reproduction quality associated with the record information.

(Information Recording Method)

The above object of the present invention can be also achieved by an information recording method provided with: a recording process of recording record information, by irradiating laser light having a predetermined power, onto an information recording medium on which pre-information for controlling the recording of the record information is recorded in advance; and a controlling process of controlling the power to record the record information with such the power that first reproduction quality, which is reproduction quality of the pre-information, satisfies a predetermined first reference.

According to the information recording method of the present invention, it is possible to receive the same various benefits as those of the above-mentioned information recording apparatus of the present invention.

Incidentally, in response to the various aspects of the above-mentioned information recording apparatus of the present invention, the information recording method of the present invention can also adopt various aspects.

(Computer Program)

The above object of the present invention can be also achieved by a computer program making the computer function as the above-mentioned information recording apparatus (including its various aspects). More specifically, it makes the computer function as at least one portion of the recording device and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned information recording apparatus of the present invention, the computer program of the present invention can also adopt various aspects.

The above object of the present invention can be also achieved by a computer program product in a computer-readable medium for tangibly embodying a program of instructions executable by a computer, the computer program product making the computer function as at least one portion of the recording device and the controlling device of the above-mentioned information recording apparatus.

According to the computer program product of the present invention, at least one portion of the recording device and the controlling device of the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the recording device and the controlling device of the above-mentioned information recording apparatus.

These effects and other advantages of the present invention become more apparent from the following embodiment.

As explained above, according to the information recording apparatus of the present invention, it is provided with the recording device and the controlling device, and according to the information recording method of the present invention, it is provided with the recording process and the controlling process. Therefore, it is possible to record the record information while properly controlling the power of the laser light, to thereby effectively improve the reproduction quality of the record information to be recorded.

BRIEF DESCRIPTION OF DRAWINGS

FIG. 1 is a substantial plan view showing the basic structure of an optical disc, as one example of an information recording medium, used in an embodiment of the information recording apparatus of the present invention, the optical disc having a plurality of recording areas, in the upper part.

FIG. 2 is a block diagram conceptually showing the basic structure of the embodiment of the information recording apparatus of the present invention.

FIG. 3 is a flowchart conceptually showing a flow of an entire recording operation on the information recording apparatus in the embodiment.

FIG. 4 is a flowchart conceptually showing a flow of an operation of detecting an optimum laser power associated with a first operation example of the information recording apparatus in the embodiment.

FIG. 5 is a schematic timing chart showing one OPC process in the case of 16 power-steps, in the operation of the information recording apparatus in the embodiment.

FIG. 6 are correlation graphs generated by the OPC operation on the information recording apparatus in the embodiment.

FIG. 7 is a correlation graph conceptually showing a correlation between a laser power and reproduction quality (an AR characteristic and a jitter value), generated by the information recording apparatus in the embodiment.

FIG. 8 is a correlation graph conceptually showing a correlation between a laser power and reproduction quality (the AR characteristic and asymmetry), generated by the information recording apparatus in the embodiment.

FIG. 9 are perspective views conceptually explaining the shape of record marks formed in each of high-speed recording and low-speed recording.

FIG. 10 is a flowchart conceptually showing a flow of the operation of detecting the optimum laser power associated with a second operation example of the information recording apparatus in the embodiment.

DESCRIPTION OF REFERENCE CODES

1 information recording apparatus
100 optical disc
501 optical pickup
503 RF amplifier
504 laser drive circuit
505 OPC circuit
513 LPP error rate detector
521 RF amplitude measurement circuit
540 jitter measurement circuit
550 CPU
560 memory

BEST MODE FOR CARRYING OUT THE INVENTION

Hereinafter, the best mode for carrying out the present invention will be explained in each embodiment in order, with reference to the drawings.

Hereinafter, the embodiment of the present invention will be explained with reference to the drawings.

Firstly, with reference to FIG. 1, an information recording medium used in the embodiment of the information recording apparatus of the present invention will be explained. In the embodiment, the explanation will be given by using a recordable type optical disc, as the information recording medium. FIG. 1 is a substantial plan view showing the structure of the optical disc having a plurality of recording areas, on the upper side, in association with a conceptual view showing an area structure in the radial direction on the lower side.

As shown in FIG. 1, an optical disc 100 is recordable in various recording methods, such as a magneto optical method and a phase change method, in which the recording (writing) can be performed a plurality of times, or once, for example. It has a recording surface on a disc main body with a diameter of about 12 cm, as is a DVD. On the recording surface, the optical disc 100 is provided with: a center hole 102 as the center; a lead-in area 104; a data recording area 106; and a lead-out area 108, from the inner circumferential side to the outer circumferential side. Then, in each area, a groove track and a land track are alternately placed, spirally or concentrically, centered on the center hole 102. The groove track may be wobbled. Pre-pits may be formed on one or both of the tracks. Incidentally, the present invention is not particularly limited to the optical disc having these three areas. For example, even if the lead-in area 104 or the lead-out area 108 does not exist, a file structure explained below can be constructed. Moreover, as described later, the lead-in area 104 or the lead-out area 108 may be further segmentized.

(Embodiment of Information Recording Apparatus)

Next, with reference to FIG. 2 to FIG. 10, the embodiment of the information recording apparatus of the present invention will be explained.

(1) Basic Structure

Firstly, the basic structure of the information recording apparatus in the embodiment will be explained with reference to FIG. 2. FIG. 2 is a block diagram conceptually showing the basic structure of the embodiment of the information recording apparatus of the present invention.

As shown in FIG. 2, an information recording apparatus 1 in the embodiment is constructed, including: an optical pickup 501; a spindle motor 502; a RF (Radio Frequency) amplifier 503; a laser drive circuit 504; an OPC (Optimum Power Control) circuit 505; a tracking servo circuit 506; an actuator drive circuit 507; an LPP (Land Pre Pit) detector 510; a GATE generation circuit 511; an LPP data detector 512; an LPP error rate detector 513; an equalizer 520; a RF amplitude measurement circuit 521; a binary circuit 530; a decoder 531; a PLL (Phase Locked Loop) 532; a jitter measurement circuit 540; a CPU 550; and a memory 560.

The optical pickup 501 is one specific example of the "recording device" of the present invention. The optical pickup 501 performs the recording or the reproduction with respect to the optical disc 100, and is provided with a semiconductor laser apparatus, various lenses, actuators, or the like. More specifically, the optical pickup 501 irradiates the optical disc 100 with a light beam, such as laser light LB, as reading laser having a first power upon reproduction, and as writing laser having a second power, with it modulated, upon recording. The power adjustment of the laser light LB is performed under the control of the laser drive circuit 504, which is one example of the "controlling device" described later. More specifically, the laser light LB having a predetermined laser power is irradiated, by driving the semiconductor laser apparatus by using a driving pulse defined by a predetermined pulse strategy. Moreover, the optical pickup 501 is constructed to move in the radial direction or the like of the optical disc 100 by using the actuator drive circuit 508 driven by the tracking servo circuit 506, a not-illustrated slider, or the like.

The spindle motor 502 is constructed to rotate the optical disc 100 at a predetermined speed, under spindle servo from a not-illustrated servo circuit or the like.

The RF amplifier 503 amplifies a signal outputted from a not-illustrated PD (Photo Detector) for receiving reflected light of the laser light LB irradiated from the optical pickup 501, and outputs the amplified signal. Specifically, the RF amplifier 503 outputs a RF signal as a reading signal (or an LPP signal, a wobble signal, etc.) to the LPP detector 510, the equalizer 520, the binary circuit 530, and the jitter measurement circuit 540.

The laser drive circuit 504 is one specific example of the "controlling device" of the present invention, and it drives the semiconductor laser disposed in the optical pickup 510, in order to detect an optimum laser power in the process of recording and reproducing an OPC pattern described later, at the time of an OPC process described later. After that, at the time of data recording, it drives the semiconductor laser of the optical pickup 501, with the optimum laser power detected by the OPC process. At the time of data recording, the optimum laser power is modulated in accordance with the record data.

The OPC circuit 505 is constructed to output a signal indicating the OPC pattern, to the laser drive circuit 504, when the OPC pattern is recorded in the OPC process before the recording operation. Incidentally, the explanation about the OPC process will be described later in detail (refer to FIG. 5, etc.).

The tracking servo circuit 507 is constructed to detect various servo signals, such as a tracking error signal, from the RF signal as the reading signal from the optical pickup 501. Then, the various servo signals can be outputted to the actuator drive circuit 508 or the spindle motor 502.

The actuator drive circuit 508 is constructed to control the displacement of the optical pickup 501 in the radial direction or the rotational direction of the optical disc 100, on the basis of the various servo signals outputted from the tracking servo circuit 507. Then, it is possible to record the various data by irradiating the desired recording position of the optical disc 100 with the laser light LB, by using the optical pickup 501 whose displacement is controlled by the actuator drive circuit 507.

The LPP detector 510 is constructed to detect a push-pull signal, which indicates an LPP signal, on the basis of the output signal corresponding to the amount of received light from the RF amplifier 503. At this time, in order to detect the push-pull signal, the light receiving element of the optical pickup 501 is preferably constructed to receive the reflected light of the laser light LB, with it divided into a plurality of areas, such as two areas or four areas.

Incidentally, the LPP is one specific example of the "pre-signal" of the present invention, and is a pit formed in advance on the recording track (particularly, the land track) of a DVD-R/RW or the like, which is one specific example of the optical disc 100. It is used for the generation of a recording clock signal at the time of data recording, and the address position on the optical disc 100, for example.

The GATE generation circuit 511 is constructed to generate a gate signal for detecting LPP data. Specifically, by generating the gate signal while focusing the wobble in which the LPP is formed, it is possible to detect the LPP data and effectively remove noise included in the LPP data. Of course, needless to say, it is possible to detect the LPP data even if using the gate signal generated by detecting a wobble signal.

The LPP data detector 512 is constructed to detect the LPP data, on the basis of the gate signal generated by the GATE generation circuit 511, from the LPP signal outputted from the LPP detector 510. For example, it is constructed to detect, from the LPP data, pre-format address information indicating the address position on the optical disc 100 and information indicating a clock in the recording operation.

The LPP error rate detector 513 is constructed to detect the error rate of the LPP data detected on the LPP data detector 512. This error rate is referred to as an LPP characteristic after recording (or BERLPPa: Block Error Rate LPP after), for example, and indicates the a numerical value same as or similar to an AR characteristic.

Here, the brief description of the AR characteristic will be added. The optical pickup 501 is provided with a not-illustrated two-division light receiving circuit, and can generate the push-pull signal from divisional reproduction signals. Then, what is referred to as the AR characteristic is a ratio between the maximum amplitude (i.e. a level with the LPP existing) and the minimum amplitude (i.e. a level without the LPP existing in reality and at the position of a wobble center) of an LPP (Land Pre-Pit) signal component, existing between the group tracks, which are the recording track, provided on the optical disc 100, out of the push-pull signal component. For example, by overlapping or superimposing, on an oscilloscope, the reproduction signal in reproducing the LPP provided on a DVD-R/RW, for example, it is possible to recognize the maximum amplitude and the minimum amplitude of the reproduction signal. By this, it is possible to calculate the AR characteristic. However, on the actual information recording apparatus 1, it is possible to perform recognition equivalent to the measurement of the AR characteristic, by calculating the error rate of the LPP data, so that it is possible to perform the similar operation (measurement).

In the LPP signal, there are recorded the address information, recording strategy information peculiar to the disc which is necessary in the recording, or the like. Moreover, the LPP signal is a basic signal necessary to generate the recording clock which is necessary specially when the data is recorded in the beginning or when the data is recorded in the middle (i.e. additionally recorded or written once), and it is an important signal in the DVD-R/RW system. However, the signal quality of the LPP signal deteriorates if the data is recorded onto the groove track, so that the LPP signal quality after the recording is defined in the standard (refer to DVD Specifications for Recordable Disc). What is represented in numerical values can be said to be the AR characteristic.

The equalizer 520 is constructed to perform predetermined filtering (or a signal process) on the RF signal detected by the RF amplifier 503 or the like, and to output the signal after the filtering (e.g. envelop detection or the like) to the RF amplitude measurement circuit 521.

The RF amplitude measurement circuit 521 is constructed to detect the peak value and the bottom value of the envelope detection of the RF signal, which is the output signal from the RF amplifier 503, in order to detect the optimum laser power (i.e. one specific example of the "power that . . . satisfies the first reference" of the present invention), under the control of the CPU 550, when the OPC pattern is reproduced in the OPC process. The RF amplitude measurement circuit 521 may include an A/D (Analog/Digital) converter or the like, for example.

The binary circuit 530 is constructed to generate a binary signal from the RF signal detected by the RF amplifier or the like. Specifically, it generates a pulse row from the detected RF signal or the like, for example. Then, it can output the binarized signal to both the decoder 531 and the PLL 532.

The decoder 531 is constructed to perform decoding or the like on the RF signal binarized on the binary circuit 530, to thereby output the reproduction data to the exterior via a buffer and an external output interface. Then, predetermined contents are reproduced and outputted on external output equipment (e.g. a display device, such as a liquid crystal display and a plasma display, or a speaker, or the like) connected to the external output interface.

The PLL 532 is constructed to generate the clock signal, which is a reference in the recording operation, on the basis of the binary signal (particularly, the binarized LPP signal and the binarized wobble signal) outputted from the binary circuit 530.

The jitter measurement circuit 540 is constructed to detect a jitter value from the RF signal detected by the RF amplifier 503.

The CPU 550 receives the data from the tracking servo circuit 506, a recording assign strategy detector 514, the RF amplitude measurement circuit 521, the jitter measurement circuit 540, or the like, for example, in order to control the entire information recording apparatus 1, and performs the subsequent control operation. Then, it controls the entire information recording apparatus 1, by outputting a system command to each device provided for the information recording apparatus 1, on the basis of the data. Normally, software for operating the CPU 550 is stored in an external memory, for example.

The memory 560 includes a semiconductor memory, such as a RAM (Random Access Memory) and a flush memory, for example, and is constructed to temporarily record the various data necessary for the operation of the information recording apparatus 1. Moreover, it is constructed to record a correlation equation, the optimum laser power, correlation information, or the like, as described later.

Incidentally, on the above-mentioned information recording apparatus 1, in order to explain the characteristics of the present invention in an easy-to-understand manner, the requirements for the construction of the embodiment are extracted and illustrated. Thus, it will be obvious that there may be provided requirements other than the above-mentioned requirements.

(Operation Principle)

Next, with reference to FIG. 3 to FIG. 10, the operation principle of the information recording apparatus 1 will be explained.

(1) Entire Recording Operation

Firstly, with reference to FIG. 3, an explanation will be given to a flow of the entire recording operation of the information recording apparatus 1 in the embodiment in recording various data. FIG. 3 is a flowchart conceptually showing a flow of an entire recording operation on the information recording apparatus in the embodiment.

As shown in FIG. 3, firstly, the optical disc 100 is loaded on the information recording apparatus (step S101). Then, under the control of the CPU 550, a seek operation is performed by the optical pickup 501, and various management data required for the recording process onto the optical disc 100 is obtained. In particular, by reading land pre-pits (LPP) in the lead-in area 104, a predetermined (or as default) pulse strategy set in advance is obtained. On the basis of the management data, by the control of the CPU 550, the data is recorded onto the optical disc 100, via an external input interface or the like, for example, in accordance with an instruction from external input equipment or the like, for example.

After this loading operation, the optimum laser power for actually recording the data is detected (step S102). The operation of detecting the optimum laser power will be described in detail later (refer to FIG. 4 or the like).

Then, the data to be actually recorded is recorded from a predetermined address position of the optical disc 100 (step S103). Here, in order to irradiate the laser light LB by using a driving pulse depending on the optimum laser power detected in the step S102, the optical pickup 501 (more specifically, the semiconductor laser apparatus) is controlled by the operation of the laser drive circuit 504, under the control of the CPU 550. Then, the data is mainly recorded into the data recording area 106 shown in FIG. 1.

Specifically, DVD-modulation (e.g. 8-16 modulation) is performed by a DVD modulator with respect to the data for recording which is inputted from the external input interface or the like. Then, an ECC code, which is a code for data error correction, is added or appended to the modulated data, by each predetermined block unit (e.g. ECC block unit). Then, the desired laser light LB is irradiated by the optical pickup 501, to thereby record the data for recording, on which the modulation is performed and to which the ECC code is appended, onto the optical disc 100, as recording pits, record marks, or a recording pattern.

Then, it is judged whether or not the recording of all the data is ended (step S104). As a result of the judgment, if it is judged that the recording of all the data is ended (the step S104: Yes), the recording operation is ended. As occasion demands, a finalize process for maintaining compatibility with a DVD-ROM may be performed, or the optical disc 100 may be ejected from the information recording apparatus 1.

Next, with reference to FIG. 4 to FIG. 10, an explanation will be given for the operation of detecting the optimum laser power in the step S102 in FIG. 3. Here, an explanation will be given for a specific example as a first operation example, in which the detection operation of detecting the optimum laser power is performed on the basis of the AR characteristic, regardless of the data recording speed, and a specific example as a second example, in which such a detection operation that the method of detecting the optimum laser power is changed in accordance with the data recording speed, is performed.

(1) FIRST OPERATION EXAMPLE

Firstly, with reference to FIG. 4 to FIG. 9, the first operation example will be explained. Here, while a flow of the entire detection operation is explained with reference to FIG. 4, the first operation example is explained with reference to the other drawings, as occasion demands. FIG. 4 is a flowchart conceptually showing the flow of the operation of detecting the optimum laser power associated with the first operation example.

As shown in FIG. 4, firstly, the OPC process is performed (step S201). Now, a detailed explanation will be given for the OPC process, with reference to FIG. 5. FIG. 5 is a schematic timing chart showing one OPC process in the case of 16 power-steps, in the operation of the information recording apparatus in the embodiment.

Firstly, under the control of the CPU 550, the optical pickup 501 is displaced into a PCA (Power Control Area) located in the lead-in area 104 or the like, for example, on the optical disc 100. Then, the laser power is changed sequentially step-by-step (for example, mutually different 16 step), and a test signal, such as the OPC pattern, is recorded into the PCA. Specifically, the test signal, such as a reference OPC pattern as shown in FIG. 5, generated by the OPC circuit 505, is recorded. The test signal includes a 3T to 11T or 14T random pattern, for example, as one example. Such an OPC pattern is generated in accordance with a predetermined strategy, under the control of the CPU 550. FIG. 5 shows, as one specific example, an aspect of recording the OPC pattern, which includes a first pit section in which 3T pattern test signal out of the random pattern is recorded and a second pit section in which the 11T pattern test signal is recorded, with each laser power changed step-by-step. Of course, a different OPC pattern may be used, with each laser power changed step-by-step.

The laser drive circuit 504 drives the semiconductor laser located in the optical pickup 504, in order to change the laser power sequentially step-by-step, by using the OPC pattern.

Then, after the recording of the OPC pattern into the PCA is completed, the recorded portion in the PCA (i.e. the OPC pattern) is reproduced, under the control of the CPU 550. Then, various reproduction quality by a unit of each laser power changed step-by-step is detected from the reproduced RF signal. For example, the asymmetry (or β value) may be detected from the RF peak value and the RF bottom value, measured by the operation of the RF amplitude measurement circuit 521, or the jitter value may be detected by the operation of the jitter measurement circuit 540. Alternatively, the AR characteristic (or the LPP characteristic after recording) may be detected by the operation of the LPP data detector 512 or the LPP error rate detector 513. The detection of the reproduction quality, as described above, is performed depending on the number of times of recording the OPC pattern, for example, in one OPC process, with each laser power changed step-by-step.

In FIG. 4 again, on the basis of the result of the OPC process, the correlation information indicating a correlation between the laser power and the various reproduction quality (e.g. the AR characteristic, the asymmetry, the jitter value, etc.) is generated, under the control of the CPU 550 (step S220). From the correlation information, it is possible to generate information indicating a relationship between the laser power changed step-by-step and the various reproduction quality of the OPC pattern recorded with the laser power, as shown in FIG. 6. Incidentally, FIG. 6 are correlation graphs generated by the OPC operation.

For example, by plotting the asymmetry obtained by reproducing the OPC pattern and connecting the plots with an approximate curve, by which on a graph with the asymmetry as the vertical axis and the laser power changed step-by-step as the horizontal axis, the correlation information as shown in FIG. 6(a) can be obtained. The approximate curve can be generated by using a mathematical or statistical method, such as a least square method, for example.

Moreover, with regard to the AR characteristic, which is another reproduction quality, in the same manner, the correlation information can be generated, as shown in FIG. 6(b). The correlation information indicating the correlation relationship between the laser power and the AR characteristic corresponds to one specific example of the "correlation information" of the present invention. Moreover, even with regard to the jitter value, which is another reproduction quality, in the same manner, the correlation information can be generated, as shown in FIG. 6(c).

Incidentally, the optimum laser power may be detected by performing a mathematical operation or the like, for example, in accordance with the relationship between the laser power and the various reproduction quality, obtained by reproducing the OPC pattern.

In FIG. 4 again, under the control of the CPU 550, it is judged whether or not the AR characteristic, which corresponds to the laser power with which the jitter is bottom (i.e. the jitter value is minimum) or the asymmetry is "0", is a maximum value (step S203).

The information recording apparatus 1 in the embodiment is constructed to determine an optimum ratio, by particularly emphasizing the AR characteristic, out of the data reproduction quality. Then, the condition that "the AR characteristic is a maximum value", corresponds to one specific example of the "predetermined first reference" of the present invention. Moreover, the condition that "the jitter is bottom (i.e. the jitter value is minimum) or the asymmetry is "0"", corresponds to one specific example of the "predetermined second reference" of the present invention.

As a result of the judgment, if it is judged that the AR characteristic which corresponds to the laser power with which the jitter is bottom or the asymmetry is "0", is not a maximum value (the step S203: No), the laser power with which the AR characteristic is a maximum value is detected as the optimum laser power. Even at this time, it is more preferable that the jitter value or the asymmetry corresponding to the optimum laser power is a good value in the standard (i.e. the jitter value or the asymmetry is optimum).

On the other hand, if it is judged that the AR characteristic which corresponds to the laser power with which the jitter is bottom or the asymmetry is "0", is a maximum value (the step S203: Yes), the laser power with which the jitter is bottom or the asymmetry is "0" (i.e. in this case, the laser power with which the AR characteristic is a maximum value) is detected as the optimum laser power.

The operation of judging whether or not the AR characteristic which corresponds to the laser power with which the jitter is bottom (i.e. the minimum jitter value) or the asymmetry is "0", is optimum, will be specifically explained by using the correlation information shown in FIG. 7 and FIG. 8. FIG. 7 shows the correlation information indicating the correlation between the laser power and each of the AR characteristic and the jitter value. FIG. 8 shows the correlation information indicating the correlation between the laser power and each of the AR characteristic and the asymmetry.

On a graph with the reproduction quality, such as the jitter value and the AR value, as the vertical axis and the laser power changed as occasion demands as the horizontal axis, by plotting each of the jitter value and the AR value obtained by reproducing the test data and connecting the plots with an approximate curve, the correlation information as shown in FIG. 7 can be obtained. The approximate curve can be generated by using a mathematical or statistical method, such as a least square method, for example.

As shown in FIG. 7, the jitter value is minimum (in FIG. 7, the jitter value="6.0%") when the laser power="15.83 mW". At this time, referring to the AR characteristic, the AR characteristic="25.9%". On the other hand, when the AR characteristic is a maximum value, the AR characteristic="26.8%". Therefore, in this case, the laser power with which the AR characteristic is a maximum value (i.e. from FIG. 7, a laser power of "15.54 mW") is detected as the optimum laser power. Even if such a laser power is detected as the optimum laser power, the jitter value is in a range of about 7%, and it realizes a good value in the standard of a DVD-R/RW, which is one specific example of the optical disc 100, for example. Thus, a problem does not occur, such as the reproduction quality particularly deteriorates.

In the same manner, on a graph with the reproduction quality, such as the asymmetry and the AR value, as the vertical axis and the laser power changed as occasion demands as the horizontal axis, by plotting each of the asymmetry and the AR value obtained by reproducing the test data and connecting the plots with an approximate curve, the correlation information as shown in FIG. 8 can be obtained. The approximate curve can be generated by using a mathematical or statistical method, such as a least square method, for example.

As shown in FIG. 8, the asymmetry is "0" when the laser power="15.76 mW". At this time, referring to the AR characteristic, the AR characteristic="26.5%". On the other hand, when the AR characteristic is a maximum value, the AR characteristic="26.8%". Therefore, in this case, the laser power with which the AR characteristic is a maximum value (i.e. from FIG. 8, a laser power of "15.54 mW") is detected as the optimum laser power. Even if such a laser power is detected as the optimum laser power, the asymmetry has a numerical value of about "−0.02", and it realizes a good value in the standard of a DVD-R/RW, which is one specific example of the optical disc 100, for example. Thus, a problem does not occur, such as the reproduction quality particularly deteriorates.

As described above, particularly, at the time of high-speed recording, by recording the information onto the optical disc with the laser power with which the AR characteristic is maximum, even if the jitter value is not minimum or the asymmetry is not "0", as the reproduction quality when the information is reproduced, it is possible to confirm that the jitter value and the asymmetry value are substantially in an allowable range. The present invention focuses on that the extent of a change in the jitter value is mild when the high-speed recorded information is reproduced, with respect to a change in the laser power. Namely, generally, at the time of high-speed recording, the recording medium is irradiated with the laser light LB having a high laser power for a short time, so that the recorded pits tend to extend transversely, as shown in FIG. 9(b). If the recording pits extend transversely, a reproduction signal's amplitude level tends to increase, and the jitter value tends to be good when the pits are reproduced.

Moreover, the inventors of the present invention have confirmed that a change in the asymmetry value against the change in the laser power varies in a certain degree of relation to the change in the jitter value. If the jitter value becomes good, even if there is some change in the laser power, the jitter value does not greatly deteriorate, and also, the asymmetry value remains near "0". Thus, even if the laser power is changed in order to maximize the AR characteristic, the jitter value and the asymmetry can be in the allowable range.

Incidentally, in the above-mentioned embodiment, the laser power with which the AR characteristic is a maximum value is detected as the optimum laser power; however, the present invention is not necessarily limited to this. For example, the laser power with which the AR characteristic is preferable, which corresponds to the laser power with which the jitter is bottom or the asymmetry is "0", may be detected as the optimum laser power, as well. However, the condition that "the AR characteristic is preferable" in the first operation example, is one specific example of the "predetermined first reference" of the present invention, and it is a concept that the AR characteristic shows a good value in the standard of the optical disc 100. For example, it shows the condition that if the optical disc 100 is a DVD-R, the AR characteristic realizes a value of 15% or more. It shows the condition that if the optical disc 100 is a DVD-RW, the AR characteristic realizes a value of 10% or more.

Moreover, in the case of the condition that "the jitter is preferable", instead of the condition that "the jitter is bottom", it may be judged whether or not the AR characteristic is a maximum value (or is preferable). Here, the condition that the "jitter value is preferable" is another specific example of the "predetermined second reference" of the present invention, and it is a concept that the jitter value shows a good value in the standard of the optical disc 100. For example, it shows the condition that if the optical disc 100 is a DVD-R/RW, the jitter value realizes a value of 8% or less (more preferably, a smaller value).

In the same manner, it may be judged whether or not the AR characteristic is a maximum value (or is preferable) in the condition that the "asymmetry is preferable". Here, the condition that the "asymmetry is preferable" is another specific example of the "predetermined second reference" of the present invention, and it is a concept that the asymmetry shows a good value in the standard of the optical disc 100. For example, it shows the condition that if the optical disc 100 is a DVD-R/RW, the asymmetry realizes a value in a range of −5% to 15% (more preferably, a value of 0%).

Moreover, as needed, the laser power with which the asymmetry is not in the preferable range and that both the jitter value and the AR characteristic are in the preferable range (more preferably, the jitter is bottom and the AR characteristic is a maximum value), may be detected as the optimum laser power. Alternatively, the laser power with which the jitter value is not in the preferable range and that both the asymmetry and the AR characteristic are in the preferable range (more preferably, the asymmetry is "0" and the AR characteristic is a maximum value), may be detected as the optimum laser power. Alternatively, if emphasizing the viewpoint of reducing the error rate of the LPP signal at the time of high-speed recording, the laser power with which the AR characteristic is in the preferable range (more preferably, it is a maximum value), may be detected as the optimum laser power, even if both the jitter value and the asymmetry are not in the preferable range. However, from the viewpoint of realizing the more preferable reproduction quality (i.e. properly recording the data), it is more preferable to detect, as the optimum laser power, the laser power with which the AR characteristic is a maximum value (or preferable) in the case where the jitter value is minimum or the asymmetry is "0", and it is preferable to detect, as the optimum laser power, the laser power with which each of the asymmetry, the jitter value, and the AR characteristic is in the preferable range.

Moreover, the correlation information shown in FIG. 7 and FIG. 8 may be recorded into the memory 560, which is one specific example of the "storing device" of the present invention, or it may be recorded into a predetermined recording area of the optical disc 100. Moreover, the optimum laser power detected in the step S204 or step S205 in FIG. 4 may be also recorded into the memory 560, or it may be recorded into a predetermined recording area of the optical disc 100.

As described above, particularly at the time of high-speed recording, without depending on the asymmetry and the jitter value emphasized in the normal OPC, by detecting the optimum laser power with particularly emphasizing the AR characteristic upon the reproduction, it is possible to obtain the good reproduction quality even if the data is recorded particularly at the high-speed recording speed. This is caused by a difference between the recording pits formed on the optical disc 100 at the time of high-speed recording and the recording pits formed on the optical disc 100 at the time of low-speed recording. This difference in the recording pits will be specifically explained with reference to FIG. 9. FIG. 9 are perspective views conceptually explaining the shape of the recording pits formed in each of the high-speed recording and the low-speed recording.

As shown in FIG. 9(a), at the time of low-speed recording (specifically, at the time of recording at an about 1-time or 2-time speed), the rotational speed of the optical disc 100 is relatively slow, so that the time of irradiating the laser light LB is longer than the time of irradiating the laser light LB at the time of high-speed recording (specifically, at the time of recording at an about 4-time speed or more). Therefore, the recording pits are formed in a proper pit shape.

In contrast, as shown in FIG. 9(b), at the time of high-speed recording, the rotational speed of the optical disc 100 is relatively fast, so that the time of irradiating the laser light LB is shorter than the time of irradiating the laser light LB at the time of low-speed recording. In addition, as the rotational speed of the optical disc 100 increases, the power of the laser light LB required for the recording operation also increases. Therefore, due to the irradiation of the laser light LB for a short time and having a high laser power, the recording pits are formed not only on the groove track but also on the LPP. This greatly deteriorates the AR characteristic, which is the reading characteristic of the LPP.

However, according to the information recording apparatus 1 in the embodiment, the optimum laser power is detected with emphasizing the AR characteristic as the reproduction quality, so that even at the time of high-speed recording, it is possible to form the recording pits in the proper shape, as in the low-speed recording. Namely, even at the time of high-speed recording, it is possible to obtain the good reproduction quality (particularly, the AR characteristic).

At this time, it is more preferable to irradiate the laser light LB on the basis of a driving pulse shown on the right of FIG. 9(c) (i.e. a driving pulse having a top pulse and a middle pulse). By irradiating the laser light LB on the basis of such a driving pulse, it is possible to more effectively prevent that the record marks are formed even in the LPP portion as shown in FIG. 9(b). Namely, as shown on the left of FIG. 9(c), even at the time of high-speed recording, it is possible to more preferably form the record marks in the proper shape, as in the low-speed recording. In this regard, if the laser light LB is irradiated on the basis of the driving pulse corresponding to the middle pulse shown in FIG. 9(c), it is possible to relatively reduce the laser power in a period corresponding to the middle pulse, and prevent the record marks from swelling. Moreover, such a laser power that not only the AR characteristic is emphasized, but also the asymmetry and the jitter value, which are another reproduction quality, have good values, is detected as the optimum laser power, so that it is possible to obtain the better reproduction quality. Namely, as compared to the conventional information recording apparatus, it is possible to further improve the reproduction quality of the data to be recorded.

Consequently, according to the information recording apparatus 1 in the embodiment, it is possible to preferably detect the optimum laser power which is a preferable laser power. Thus, if the optical pickup 501 is controlled to irradiate the laser light LB by using the driving pulse corresponding to the optimum laser power, it is possible to further improve the reproduction quality of the data to be recorded.

Moreover, the embodiment is explained by using the LPP, as one specific example of the "pre-information" of the present invention; however, it is not limited to this. For example, in the case of a DVD+R/RW as one specific example of the optical disc 100, the wobble is generated by waving the groove track in a predetermined cycle, and also, for example, BPM (Bi Phase Modulation) is performed on the wobble, to thereby record one specific example of the "pre-information" of the present invention. Therefore, in this case, it is preferable to use the reading error rate of the wobble or the like (e.g. ATIP (Absolute Time In Pre-groove) etc.), instead of the AR characteristic, as the reproduction quality, to perform the various operations in the embodiment (particularly, the operation of detecting the optimum ratio).

Moreover, in addition to or instead of the AR characteristic, the degree of modulation of the RF signal, a PI error which is an error rate obtained by counting the number of errors when the data is reproduced, the error rate of the RF signal itself, or the like, may be used, as the reproduction quality.

(2) SECOND OPERATION EXAMPLE

Next, with reference to FIG. 10, a second operation example will be explained. FIG. 10 is a flowchart conceptually showing a flow of the operation of detecting the optimum laser power associated with the second operation example.

As shown in FIG. 10, firstly, the optical disc 100 is loaded (the step S101). Then, it is judged whether or not the recording operation is performed on the optical disc 100, at the 4-time recording speed or more, with respect to the 1-time recording speed, which is the standard recording speed (step S301).

As a result of the judgment, if it is judged that the recording operation is performed at the 4-time recording speed or more (the step S301: Yes), the optimum laser power is detected, as illustrated in the above-mentioned first operation example (the step S102). Namely, the optimum laser power is detected with emphasizing the improvement in the AR characteristic. Then, the subsequent recording operation is performed (the step S103), and as needed, the recording operation is continued, or the recording operation is ended.

On the other hand, if it is judged that the recording operation is performed at the recording speed less than the 4-time recording speed (the step S301: No), the normal OPC operation is performed to detect the optimum laser power (step S602). Specifically, the laser power with which the jitter is bottom or the asymmetry is "0", is detected as the optimum laser power. Then, after that, the recording operation is performed (the step S103). Here, the recording operation is performed by irradiating the laser light LB on the basis of the optimum laser power detected in the step S302. Then, as needed, the recording operation is continued, or the recording operation is ended.

As described above, by changing the method of detecting the optimum laser power in accordance with the recording speed, as occasion demands, particularly at the time of high-speed recording (i.e. at the time of recording at the 4-time recording speed or more) in which the deterioration of the AR characteristic is a big problem, the optimum laser power is detected with emphasizing the improvement in the AR characteristic, as described above. By this, at the time of high-speed recording, it is possible to receive the above-mentioned various benefits.

On the other hand, at the time of low-speed recording (i.e. at the time of recording at the recording speed less than the 4-time recording speed) in which the deterioration of the AR characteristic is not such a big problem, even if the optimum laser power is not detected with emphasizing the improvement in the AR characteristic, as described above, it is possible to preferably record the data without deteriorating the AR characteristic very much. In fact, at the time of low-speed recording, the deterioration of the jitter value and the asymmetry is a big problem, so that it is desired to detect the optimum laser power so as to improve the jitter value and the asymmetry. Therefore, according to the second operation example, it is possible to properly record the data, without deteriorating the reproduction quality, even at the time of low-speed recording.

Of course, even in this modified example, depending on the recording quality of the data recorded at the time of low-speed recording, the optimum laser power may be detected with emphasizing the improvement in the AR characteristic, as described above, as needed.

Moreover, regardless of the change in the recording speed, it may be constructed to select, as occasion demands, whether to emphasize the improvement in the AR characteristic to detect the optimum laser power, or emphasize the improvement in the asymmetry or the jitter value to detect the optimum laser power. Such selection may be automatically performed by the operation of the CPU 550, which is one specific example of the "selecting device" of the present invention. In this case, it may be also constructed to select which method is used to detect the optimum laser power, by measuring the reproduction quality of the actually recorded data, as needed, for example. Alternatively, such selection may be performed on the basis of an instruction from a user of the information recording apparatus 1, given by using an external input apparatus, such as a remote controller, an operation button, and a touch panel, which is another specific example of the "selecting device" of the present invention.

Moreover, the present invention is described with emphasizing the improvement in the AR characteristic. However, in a system other than the DVD-R/RW, as the information corresponding to the pre-information, explained as the LPP in the present invention, for example, there are used a CAPA signal generated by embossed pits in the case of a DVD-RAM, and a wobble signal generated by the groove wobble in the case of a DVD+R/RW and a Blu-Ray system, and the phase modulation of these signals is performed to record the address and other important signals. Then, these signals have the common problem that their signal quality deteriorates, so that it is obvious that the present invention is effective in the same manner.

Moreover, in the above-mentioned embodiment, as one example of the information recording medium, the optical disc 100 is explained, and as one example of the information recording apparatus, the recorder associated with the optical disc 100 is explained. The present invention, however, is not limited to the optical disc and the recorder thereof, and can be also applied to other various information media which support high-density recording or high-transfer rate, and recorders thereof.

The present invention is not limited to the above-described embodiment, and various changes may be made, if desired, without departing from the essence or spirit of the invention which can be read from the claims and the entire specification. An information recording apparatus, an information recording method, and a computer program for recording control, which involve such changes, are also intended to be within the technical scope of the present invention.

INDUSTRIAL APPLICABILITY

The information apparatus, the information recording method, and the computer program of the present invention can be applied to an information recording apparatus, such as a DVD recorder, for example. Moreover, they can be also applied to an information recording apparatus and the like, which are mounted on or which can be connected to various computer equipment for consumer use or for business use, for example.

The invention claimed is:

1. An information recording apparatus comprising:
a recording device for recording record information, by irradiating laser light having a predetermined power, onto an information recording medium on which pre-information for controlling the recording of the record information is recorded in advance;
a controlling device for controlling said recording device to record the record information with such the power that first reproduction quality, which is reproduction quality of the pre-information, satisfies a predetermined first reference, wherein said controlling device controls said recording device to record the record information with such the power that the first reproduction quality satisfies the first reference, on the basis of correlation information indicating a correlation between the power and the first reproduction quality; and
a generating device for generating the correlation information, by controlling said recording device to record test information for test recording onto the information recording medium while changing the power, and by measuring the first reproduction quality of the pre-information recorded in advance in a recording area in which the test information is recorded;
wherein said recording device records the generated correlation information onto the information recording medium.

2. The information recording apparatus according to claim 1, wherein the record information is recorded on the information recording medium, by using a 4-time recording speed or more, as compared to a standard recording speed which is a standard in recording the record information.

3. The information recording apparatus according to claim 2, wherein
if the record information is recorded by using the 4-time recording speed or more, said controlling device controls said recording device to record the record information with such the power that the reproduction quality of the pre-information satisfies the first reference, and
if the record information is recorded by using a recording speed less than a 4-time recording speed, as compared to the standard recording speed, said controlling device controls said recording device to record the record information with such the power that at least one of a jitter value and an asymmetry value as second reproduction quality, which is reproduction quality of the record information, satisfies a predetermined second reference.

4. The information recording apparatus according to claim 1, further comprising a selecting device for selecting whether said recording device is controlled to record the record information with such the power that the first reproduction quality of the pre-information satisfies the first reference, or said recording device is controlled to record the record information with such the power that at least one of a jitter value and an asymmetry value as second reproduction quality, which is reproduction quality of the record information, satisfies a predetermined second reference.

5. The information recording apparatus according to claim 1, further comprising a storing device for storing the generated correlation information.

6. The information recording apparatus according to claim 1, wherein the pre-information is recorded in advance on the information recording medium by using pre-pits formed on a recording track of the information recording medium.

7. The information recording apparatus according to claim 6, further comprising a measuring device for measuring the first reproduction quality, on the basis of maximum amplitude and minimum amplitude of a push-pull signal generated by reproducing the pre-pits.

8. The information recording apparatus according to claim 6, further comprising a measuring device for measuring the first reproduction quality, on the basis of a reproduction error rate of the pre-information obtained by reproducing the pre-pits.

9. The information recording apparatus according to claim 1, wherein the pre-information is recorded in advance on the information recording medium by using a modulation signal which is added to a recording track of the information recording medium which oscillates in a predetermined cycle.

10. The information recording apparatus according to claim 1, wherein said controlling device controls said recording device to record the record information with such the power that the first reproduction quality of the pre-information satisfies the first reference, in the case where at least one of a jitter value and an asymmetry value as second reproduction quality, which is reproduction quality of the record information, satisfies a predetermined second reference.

11. An information recording method comprising:
a recording process of recording record information, by irradiating laser light having a predetermined power, onto an information recording medium on which pre-information for controlling the recording of the record information is recorded in advance;
a controlling process of controlling the power to record the record information with such the power that first reproduction quality, which is reproduction quality of the pre-information, satisfies a predetermined first reference, wherein said controlling process controls said recording process to record the record information with such the power that the first reproduction quality satisfies the first reference, on the basis of correlation information indicating a correlation between the power and the first reproduction quality; and
a generating process for generating the correlation information, by controlling said recording process to record test information for test recording onto the information recording medium while changing the power, and by measuring the first reproduction quality of the pre-information recorded in advance in a recording area in which the test information is recorded;
wherein said recording process records the generated correlation information onto the information recording medium.

12. A computer program product in a computer-readable medium for tangibly embodying a program of instructions executable by a computer provided in an information recording apparatus, said computer program product making the computer function as at least one portion of a recording device and a controlling device,
said information recording apparatus comprising:
said recording device for recording record information, by irradiating laser light having a predetermined power, onto an information recording medium on which pre-information for controlling the recording of the record information is recorded in advance; and
said controlling device for controlling said recording device to record the record information with such the power that first reproduction quality, which is reproduction quality of the pre-information, satisfies a predetermined first reference, wherein said controlling device controls said recording device to record the record information with such the power that the first reproduction quality satisfies the first reference, on the basis of correlation information indicating a correlation between the power and the first reproduction quality; and
a generating device for generating the correlation information, by controlling said recording device to record test information for test recording onto the information recording medium while changing the power, and by measuring the first reproduction quality of the pre-information recorded in advance in a recording area in which the test information is recorded;
wherein said recording device records the generated correlation information onto the information recording medium.

* * * * *